United States Patent [19]

Saito et al.

[11] Patent Number: 5,270,414

[45] Date of Patent: Dec. 14, 1993

[54] COPOLYMER COATING

[75] Inventors: Koichi Saito, Kyoto; Yasutake Mino, Kobe; Eizi Shimoda, Toyonaka, all of Japan

[73] Assignee: Nippon Paint Co., Ltd., Osaka, Japan

[21] Appl. No.: 938,409

[22] Filed: Aug. 31, 1992

[30] Foreign Application Priority Data

Aug. 30, 1991 [JP] Japan .................................. 3-219476

[51] Int. Cl.$^5$ ..................... C08F 26/06; C08F 120/60
[52] U.S. Cl. ................................ 526/260; 526/307.6
[58] Field of Search ........................... 526/260, 307.6

[56] References Cited

U.S. PATENT DOCUMENTS

| | | | |
|---|---|---|---|
| 2,892,821 | 6/1959 | Stewart et al. | 526/307 |
| 2,912,416 | 11/1959 | Newey | 526/307 |
| 3,072,620 | 1/1963 | Friedrich | 526/260 |
| 3,700,635 | 10/1972 | Brust | 526/307 |
| 4,205,139 | 5/1980 | Barzynski et al. | 526/307 |
| 5,115,059 | 5/1992 | Le | 526/260 |

FOREIGN PATENT DOCUMENTS

| | | |
|---|---|---|
| 0162611 | 4/1985 | European Pat. Off. |
| 4870092 | 3/1975 | Japan . |
| 50-67845 | 6/1975 | Japan . |
| 2-151667 | 6/1990 | Japan . |
| 2-194045 | 7/1990 | Japan . |
| 5067845 | 7/1990 | Japan . |
| WO90/01051 | 2/1990 | PCT Int'l Appl. |

*Primary Examiner*—Kriellion S. Morgan
*Attorney, Agent, or Firm*—Thomas R. Morrison

[57] ABSTRACT

A copolymer for a protective coating is formed from a mixture of $\alpha$, $\beta$-ethylenically unsaturated monomer, $\alpha$, $\beta$-ethylenically unsaturated carboxylic acid monomer, and amphiphilic monomer. The protective coating has an average molecular weight of 7000 to 25000 to provide the desired properties of rapid drying, substantial film strength, and easy removal with an alkaline aqueous solution.

23 Claims, No Drawings

COPOLYMER COATING

BACKGROUND OF THE INVENTION

The present invention relates generally to a protective copolymer coating, and, more particularly, to a protective copolymer coating which can be removed by an alkaline aqueous solution.

It is customary to use a protective coating on new products when transporting them or otherwise exposing them to the elements. An ideal protective coating must dry rapidly, have the strength to protect the surface of the product from the elements, and be easily removed.

Prior coatings have not had all of the foregoing properties. Rapid drying has been achieved by using a coating with a low acidity. However, the lower the acidity, the more difficult it is to remove the coating with an alkaline aqueous solution. The strength of the coatings is improved when it has a high glass transition point, but this also limits the ease of removing the coating with an alkaline aqueous solution. A coating with a high acidity and a low glass transition point is more readily removable with an alkaline aqueous solution, but it does not dry rapidly and is not very strong. This is the problem with the coating in Japanese Laid-open Patent Publication No. 62-253673. This patent discloses a protective coating of alkyl acrylate, alkyl methacrylate, $\alpha$, $\beta$-ethylenically unsaturated carboxylic acid, and $\alpha$, $\beta$-ethylenically unsaturated monomer that can be removed by an alkaline aqueous solution.

OBJECTS AND SUMMARY OF THE INVENTION

Accordingly, it is an object of the invention to provide a protective coating which overcomes the drawbacks of the prior art.

It is a further object of this invention to provide a protective coating which dries rapidly, is strong enough to protect the coated surface from the elements, and can be removed with an aqueous alkaline solution.

Briefly stated, the present invention provides a copolymer for a protective coating which is formed from a mixture of $\alpha$, $\beta$-ethylenically unsaturated monomer, $\alpha$, $\beta$-ethylenically unsaturated carboxylic acid monomer, and amphiphilic monomer. The protective coating has an average molecular weight of 7000 to 25000 to provide the desired properties of rapid drying, substantial film strength, and easy removal with an alkaline aqueous solution.

According to an embodiment of the invention, there is provided a copolymer comprising: an $\alpha$, $\beta$-ethylenically unsaturated monomer, an $\alpha$, $\beta$-ethylenically unsaturated carboxylic acid monomer, and an amphiphilic monomer.

According to a feature of the invention, there is provided a copolymer for a protective coating which is removable by an alkaline aqueous solution comprising: an $\alpha$, $\beta$-ethylenically unsaturated monomer, an $\alpha$, $\beta$-ethylenically unsaturated carboxylic acid monomer, and an amphiphilic monomer.

According to a further feature of the invention, there is provided a protective coating composition comprising: an $\alpha$, $\beta$-unsaturated monomer, an $\alpha$, $\beta$-ethylenically unsaturated carboxylic acid monomer, an amphiphilic monomer, and an additive.

According to a still further feature of the invention, there is provided a protective coating composition comprising: an $\alpha$, $\beta$-unsaturated monomer, an $\alpha$, $\beta$-ethylenically unsaturated carboxylic acid monomer, an amphiphilic monomer, and a solvent.

According to a feature of the invention, there is provided a protective coating composition comprising: an $\alpha$, $\beta$-unsaturated monomer, an $\alpha$, $\beta$-ethylenically unsaturated carboxylic acid monomer, an amphiphilic monomer, an additive, and a solvent.

According to a further feature of the invention, there is provided a method of preparing a protective coating which comprises: neutralizing a copolymer, and adjusting the copolymer to a pH of 6 or greater with a volatile and water soluble amine.

According to a still further feature of the invention, there is provided a method of removing a protective coating comprising a copolymer which comprises applying an alkaline aqueous solution to a substrate.

According to an embodiment of the invention, the copolymer has an average molecular weight of 7000 to 25000, as measured by Gel Permeation Chromatography (GPC). The $\alpha$, $\beta$-ethylenically unsaturated monomer is 65 to 93% of the copolymer's weight, the $\alpha$, $\beta$-ethylenically unsaturated carboxylic acid monomer is 7 to 20% of that weight, and the amphiphilic monomer is 0.2 to 15% of that weight.

According to a feature of the invention, the protective coating formed from the copolymer may contain additives such as surfactants, ultra-violet (UV) absorbers, corrosion inhibitors, anti-oxidation agents, or anti-foaming agents.

The above and other objects and advantages of the present invention will become apparent from the following description read in conjunction with the accompanying tables, in which like reference numerals designate the same element.

DETAILED DESCRIPTION OF THE PREFERRED EMBODIMENT

A copolymer for forming a protective coating, used to protect products in transport and from the elements, according to this invention has an average molecular weight of 7000 to 25000. The protective coating made from the copolymer is not strong enough when the weight of the copolymer is less than 7000 and it is too difficult to remove when the copolymer weighs more than 25000.

The preferred percentages of the copolymer components are 73 to 88% $\alpha$, $\beta$-ethylenically unsaturated monomer; 10 to 18% $\alpha$, $\beta$-ethylenically unsaturated carboxylic acid monomer; and 1 to 10% amphiphilic monomer.

The coating is not as easily removed with an alkaline aqueous solution when the $\alpha$, $\beta$-ethylenically unsaturated monomer exceeds 93% and when the $\alpha$, $\beta$-ethylenically unsaturated carboxylic acid is less than 7%. The coating is less waterproof when there is less than 65% $\alpha$, $\beta$-ethylenically unsaturated monomer and more than 20% $\alpha$, $\beta$-ethylenically unsaturated carboxylic acid monomer. When there is more than 15% amphiphilic monomer the coating does not dry as rapidly and is less resistant to acid rain. When there is less than 0.2% amphiphilic monomer the coating does not polymerize effectively.

The $\alpha$, $\beta$-ethylenically unsaturated monomer may be one or more of the following: alkyl acrylate, alkyl methacrylate, aromatic vinyl compound, heterocyclic vinyl compound, vinyl ester compound, halogenated vinyl compound, α-olefin compound, or a monomer having a polar functional group. It is preferable to use n-butyl acrylate and methyl methacrylate.

The alkyl acrylate of the α, β-ethylenically unsaturated monomer may be methyl acrylate, ethyl acrylate, n-propyl acrylate, i-propyl acrylate, t-butyl acrylate, 2-ethylhexyl acrylate, or lauryl acrylate.

The alkyl methacrylate of the α, β-ethylenically unsaturated monomer may be methyl methacrylate, n-propyl methacrylate, i-propyl methacrylate, t-butyl methacrylate, 2-ethylhexyl methacrylate, or lauryl methacrylate.

The aromatic vinyl compound of the α, β-ethylenically unsaturated monomer may be styrene or α-methylstyrene. The heterocyclic vinyl compound may be vinylpyrrolidone. The vinyl ester compound may be vinyl acetate, or vinyl propionate. The halogenated vinyl compound may be vinyl chloride, vinylidene chloride, or vinylidene fluoride. The α-olefin compound may be ethylene, propylene or butylene. The monomer having a polar functional group may be acrylamide, methacrylamide, acrylonitrile, methacrylonitrile, β-hydroxyethyl acrylate, or β-hydroxyethyl methacrylate.

The α, β-ethylenically unsaturated carboxylic acid monomer may be a monobasic acid such as acrylic acid, methacrylic acid, or crotonic acid. It may be a monobasic acid as described above and one or more dibasic acids such as itaconic acid, fumaric acid, or maleic acid. It is preferred to use acrylic acid or methacrylic acid.

An amphiphilic monomer should be soluble in a hydrophilic or a hydrophobic medium. It is preferred to use a moderately hydrophilic amphiphilic monomer. The amphiphilic monomer may be selected from one or more of the following: diacetone acrylamide, N,N-dimethylacrylamide, or N-acryloylmorpholine.

The copolymer according to this invention can be produced by polymerizing a mixture of the aforementioned monomers by emulsion or solution polymerization.

When the copolymer is produced by emulsion polymerization, a normal anionic emulsifier is used. The polymerizing initiator can be a water soluble peroxide including persulfate or a water soluble azo compound including azoamide compound.

When the copolymer is produced by solution polymerization the polymerizing initiator can be an oil soluble peroxide including alkyl percarboxylate or an oil soluble azo compound including azobisisobutyronitrile. The medium used is an alcohol, ester, ketone, or aromatic hydrocarbon solvent.

To use the copolymer it must first be neutralized and then its pH adjusted to 6 or more using a volatile and water soluble amine including ammonia or triethylamine.

It is preferable to add an additive to the copolymer. The additives that may be used include surfactants, ultra-violet (UV) absorbers, corrosion inhibitors, anti-oxidation agents, and anti-foaming agents. When a surfactant is added the wetting property of the coating is improved, resulting in a uniform film. A preferred surfactant is an organic fluorochemical compound. When a UV absorber is added its absorption of the UV rays from the sun prevents the deterioration of the coating and enhances its removability. Several UV absorbers are preferred including 2-hydroxybenzophenone, benzotriazole, and salicylic ester.

The drying property of the polymer solution obtained from the polymerization process and the solubility of the additives is enhanced in the presence of 1 to 50% solvent relative to the polymer solution. The solvent may be an alcohol including isopropyl alcohol, methoxypropanol, ethoxypropanol or 2-butoxyethanol, or an ester including glycol ether, or a ketone including methyl isobutyl ketone, or an aromatic hydrocarbon including xylene.

The protective coating is readily removable by an alkaline aqueous solution.

Table 1 illustrates the varying performances and properties of the coating formed according to this invention depending on the percentage and type of monomer used to form the copolymer. Table 2 illustrates the comparative embodiments used to test the performances and properties of the coating formed according to this invention. Referring to Tables 1 and 2, the embodiments labeled 1, 2, 4, and 6 in Table 1 and the comparative embodiments labeled 1, 2, 3, and 5 were prepared by using a flask equipped with an agitator, two funnels, a thermometer, a nitrogen inlet, and a reflux condenser. A solution of 134.8 parts of deionized water and 0.4 parts of anionic emulsifier were admixed in the flask. The anionic emulsifier used was ELEMINOL MON-2 produced by Sanyo Chemical Co., Ltd., Japan.

First the air in the flask was replaced with nitrogen gas through the nitrogen inlet and the flask was heated to 80° C. A polymerization initiating solution comprising 40 parts of deionized water and 0.3 parts of ammonium persulfate was added dropwise for 140 minutes from a dropping funnel into the flask, while a pre-emulsion prepared from the particular monomer compositions listed in Tables 1 and 2, 1 part lauryl mercaptan, 80 parts of deionized water, and 0.6 parts of ELEMINOL MON-2 was added dropwise for 120 minutes from the other dropping funnel. The flask was then maintained at a temperature of 80° C. for one hour to complete the polymerization.

The polymer was then cooled while being neutralized by dilute ammonia water. A resinous solution of 20% concentration was obtained. Tables 1 and 2 show the molecular weight, pH, acid value (theoretical value), and glass transition temperature (theoretical value) of the resinous solution.

Next, 48 parts of butoxyethanol, 3 parts of UV absorber, and 0.5 parts of fluorochemical surfactant were added to the resinous solution. Deionized water was added to the resinous solution, and its viscosity was adjusted for 20 seconds using a Ford cup No. 4.

The embodiments labeled 3 and 5 in Table 1 and the comparative embodiments labeled 4 and 6 in Table 2 were prepared by using a flask equipped with an agitator, two dropping funnels, a thermometer, a nitrogen inlet tube, and a reflux condenser.

First the air in the flask was replaced with nitrogen gas through the nitrogen inlet and the flask was heated to 115° C. Then a solution of 30 parts of butoxyethanol was poured into the flask. A polymerization initiating solution of 8 parts of butoxyethanol and 1.5 parts of tert-butyl peroxy-2-ethylhexanoate was added to the flask through one funnel dropwise for 180 minutes. The appropriate monomer compositions listed in Tables 1 and 2 were added through the other funnel dropwise for 180 minutes.

After the flask was maintained for 30 minutes at 115° C., a solution comprising 4 parts of butoxyethanol and 0.3 parts of tert-butyl peroxy-2-ethylhexanoate was added dropwise for 30 minutes. Then the flask was maintained at 115° C. for an additional 90 minutes to complete the polymerization.

Next, the flask was cooled to 80° C. and a solution of 3 parts of UV absorber and 0.5 parts of a fluorochemical surfactant were added to the flask. Additionally, dilute ammonia water was added to the flask to neutralize the copolymer while the flask was cooled to room temperature. A resinous solution of 20% concentration was obtained.

Tables 1 and 2 show the molecular weight, pH, acid value (theoretical value), and glass transition temperature (theoretical value) of the resinous solution.

Deionized water was added to the resinous solution, and its viscosity was adjusted for 20 seconds using a Ford cup No. 4.

The coating compositions obtained according to the procedures detailed above were tested for their drying property, their resistance to acid rain, their resistance to rust from metallic powders, and their removability by an alkaline aqueous solution.

The tests were carried out by spraying each coating on a plate of cold rolled steel treated with zinc phosphate (SURFDINE SD 2500, produced by Nippon Paint Co., Ltd.). A base coating (POWER TOP U-53, produced by Nippon Paint Co., Ltd.) was put on each test plate by electro-deposition. Subsequently, an intermediate coating (ORGA TO-4820, produced by Nippon Paint Co., Ltd.) and a final coating (ORGA TO-640 BLACK, produced by Nippon Paint Co., Ltd.) were added to each test plate by spraying. A plurality of test plates were prepared.

The coating compositions obtained according to the procedures outlined above were sprayed on the test plates with a resulting dried film thickness of $10\pm3$ $\mu$m.

The drying time of each plate was tested by placing each plate in a wind-free environment to dry at a temperature of 60° C. When the plates dried each was spotted with 2 ml of pure water. Then the drying time of each plate was determined and listed in Tables 1 and 2. The evaluation criteria were as follows:

⊚: Within 20 minutes
: Within 30 minutes
Δ: Within 40 minutes
X: More than 40 minutes The test of resistance to acid rain was conducted as follows. After being sprayed with the respective coating compositions, each test plate was dried for 10 minutes at a wind velocity of 1 meter per second. Each test plate was then spotted with 0.1 ml of diluted sulfuric acid having a pH of 2 and heated to 80° C. and dried. Subsequently, the protective coating was removed with 1% monoethanolamine solution and the condition of each test plate was observed and listed in Tables 1 and 2. The evaluation criteria were as follows:

⊚: No change
: Slight contamination around the spot
Δ: Spot trace remained clearly
X: Spot trace remained clearly over the entire area of the spot The coatings were tested for rust resistance by passing iron powder through a 200-mesh sieve over the surface of each plate. The plates were maintained horizontally for 1 hour at 80° C. The iron powder was then removed by a brush. The plate was then subjected to salt spraying for 48 hours. The protective coating was then removed using 1% monoethanolamine solution and the degree of rust spreading was measured. The results are listed in Tables 1 and 2. The evaluation criteria were as follows:

⊚: No occurrence of rust
: Spreading area of rust was no more than 1%
Δ: Spreading area of rust was no more than 10%
X: Spreading area of rust was no less than 10%

The removability of the protective coating by an alkaline aqueous solution was tested by exposing each plate in the open air for three months during the summer on Okinawa island. The protective coating was removed with 1% monoethanolamine solution and each plate was washed with water. The quantity of protective coating remaining was examined and is listed in Tables 1 and 2. The evaluation criteria were as follows:

⊚: Nothing remained
: Some remained in dotted form, but dissolved in 1% monoethanolamine solution
Δ: Remained in spot form and did not dissolve in 1% monoethanolamine solution
X: Remained and did not dissolve Having described preferred embodiments of the invention with reference to the accompanying drawings, it is to be understood that the invention is not limited to the precise embodiments and that various changes and modifications may be affected therein by one skilled in the art without departing from the scope or spirit of the invention which is limited only by the appended claims.

TABLE 1

| | Embodiments | | | | | |
|---|---|---|---|---|---|---|
| | 1 | 2 | 3 | 4 | 5 | 6 |
| Monomer Composition %* | | | | | | |
| Methyl methacrylate | 45.7 | 42.6 | 48.8 | 40.1 | 45.1 | 43.5 |
| n-Butyl acrylate | 36.4 | 37.0 | 32.0 | 34.6 | 31.3 | 34.6 |
| Methacrylic acid | 16.9 | 15.4 | — | 15.3 | — | 16.9 |
| Acrylic acid | — | — | 12.2 | — | 11.6 | — |
| Diacetone acrylamide | 1.0 | 5.0 | 5.0 | 10.0 | 12.0 | 5.0 |
| Acrylamide | — | — | — | — | — | — |
| β-Hydroxyethyl methacrylate | — | — | 2.0 | — | — | — |
| Polymerization method | Emulsion polymerization | Emulsion polymerization | Solution polymerization | Emulsion polymerization | Solution polymerization | Emulsion polymerization |
| Resin Properties | | | | | | |
| Number-average molecular weight ($\times 10^3$) | 12 | 12 | 12 | 12 | 12 | 12 |
| pH | 7.5 | 7.5 | 7.5 | 7.5 | 7.5 | 7.5 |
| Acid value (Calculated value) | 110 | 100 | 95 | 100 | 90 | 110 |
| Glass transition temp. °C. | 33 | 30 | 30 | 33 | 30 | 35 |
| Performance of coating | | | | | | |
| Drying property | ○ | ⊚ | ⊚ | ⊚ | ⊚ | ○ |
| Resistance to acidic rain | ⊚ | ⊚ | ⊚ | ⊚ | ⊚ | ⊚ |

TABLE 1-continued

| | Embodiments | | | | | |
|---|---|---|---|---|---|---|
| | 1 | 2 | 3 | 4 | 5 | 6 |
| Resistance to iron powder | ⊙ | ○ | ○ | ⊙ | ○ | ⊙ |
| Removability by alkaline solution | ⊙ | ⊙ | ⊙ | ○ | ○ | ⊙ |

*Weight %

TABLE 2

| | Comparative Embodiments | | | | | |
|---|---|---|---|---|---|---|
| | 1 | 2 | 3 | 4 | 5 | 6 |
| Monomer Composition %* | | | | | | |
| Methyl methacrylate | 46.3 | 31.7 | 41.0 | 40.6 | 53.5 | 40.6 |
| n-Butyl acrylate | 37.9 | 32.9 | 33.6 | 34.1 | 31.9 | 28.7 |
| Methacrylic acid | 15.3 | 15.4 | 15.4 | 15.3 | 4.6 | — |
| Acrylic acid | — | — | — | — | — | 25.7 |
| Diacetone acrylamide | — | 20.0 | — | — | 10.0 | 5.0 |
| Acrylamide | — | — | 5.0 | — | — | 5.0 |
| β-Hydroxyethyl methacrylate | — | — | — | 10.0 | — | — |
| Polymerization method | Emulsion polymerization | Emulsion polymerization | Emulsion polymerization | Solution polymerization | Emulsion polymerization | Solution polymerization |
| Resin Properties | | | | | | |
| Number-average molecular weight (× 10³) | 12 | 12 | 12 | 12 | 12 | 12 |
| pH | 7.5 | 7.5 | 7.5 | 7.5 | 7.5 | 7.5 |
| Acid value (Calculated value) | 100 | 100 | 100 | 100 | 30 | 200 |
| Glass transition temp. °C. | 30 | 33 | 30 | 33 | 33 | 35 |
| Performance of coating | | | | | | |
| Drying property | ○ | △ | △ | △ | ⊙ | X |
| Resistance to acidic rain | ○ | △ | △ | △ | ○ | ○ |
| Resistance to iron powder | △ | ○ | ○ | ○ | ○ | ○ |
| Removability by alkaline | ○ | ○ | X | ○ | X | rough surface ⊙ |

*Weight %

What is claimed is:

1. A protective coating composition comprising:
    a copolymer comprising an α, ⊕-ethylenically unsaturated monomer, an α, β-ethylenically unsaturated carboxylic acid monomer, and an amphiphilic monomer selected from the group consisting of diacetone acrylamide and N-acryloylmorpholine; and
    an additive.

2. A protective coating composition as recited in claim 1, wherein said additive is selected from the group consisting of surfactants, ultra-violet absorbers, corrosion inhibitors, anti-oxidation agents, and anti-foaming agents.

3. A protective coating composition comprising:
    a copolymer comprising an α, β-ethylenically unsaturated monomer, an α, β-ethylenically unsaturated carboxylic acid monomer, and an amphiphilic monomer selected from the group consisting of diacetone acrylamide and N-acryloylmorpholine; and
    a solvent.

4. A protective coating composition as recited in claim 3, wherein said solvent is selected from the group consisting of alcohol, ester, ketone, and aromatic hydrocarbon.

5. A protective coating composition comprising:
    a copolymer comprising an α, β-ethylenically unsaturated monomer, an α, β-ethylenically unsaturated carboxylic acid monomer, and an amphiphilic monomer selected from the group consisting of diacetone acrylamide and N-acryloylmorpholine;
    an additive; and
    a solvent.

6. A copolymer as recited in claim 1, wherein said copolymer has an average molecular weight of 7000 to 25000.

7. A copolymer as recited in claim 1, wherein:
    said α, β-ethylenically unsaturated monomer makes up 65 to 93% of a weight of said copolymer;
    said α, ⊖-ethylenically unsaturated carboxylic acid monomer makes up 7 to 20% of the weight of said copolymer; and
    the amphiphilic monomer makes up 0.2 to 15% of the weight of said copolymer.

8. A copolymer as recited in claim 1, wherein the α, β-ethylenically unsaturated monomer is selected from the group consisting of alkyl acrylate, alkyl methacrylate, aromatic vinyl compound, heterocyclic vinyl compound, vinyl ester compound, halogenated vinyl compound, α-olefin compound, a monomer having a polar functional group, n-butyl acrylate and methyl methacrylate.

9. A copolymer as recited in claim 1, wherein the α, β-ethylenically unsaturated carboxylic acid monomer is a monobasic acid.

10. A copolymer as recited in claim 1, wherein the α, β-ethylenically unsaturated carboxylic acid monomer is a monobasic acid and a dibasic acid.

11. A copolymer as recited in claim 3, wherein said copolymer has an average molecular weight of 7000 to 25000.

12. A copolymer as recited in claim 3, wherein:
    said α, β-ethylenically unsaturated monomer makes up 65 to 93% of a weight of said copolymer;
    said α, β-ethylenically unsaturated carboxylic acid monomer makes up 7 to 20% of the weight of said copolymer; and the amphiphilic monomer makes up 0.2 to 15% of the weight of said copolymer.

13. A copolymer as recited in claim 3, wherein the α,β-ethylenically unsaturated monomer is selected from the group consisting of alkyl acrylate, alkyl methacrylate, aromatic vinyl compound, heterocyclic vinyl compound, vinyl ester compound, halogenated vinyl compound, α-olefin compound, a monomer having a polar functional group, n-butyl acrylate and methyl methacrylate.

14. A copolymer as recited in claim 3, wherein the α,β-ethylenically unsaturated carboxylic acid monomer is a monobasic acid.

15. A copolymer as recited in claim 3, wherein the α,β-ethylenically unsaturated carboxylic acid monomer is a monobasic acid and a dibasic acid.

16. A copolymer as recited in claim 5, wherein said copolymer has an average molecular weight of 7000 to 25000.

17. A copolymer as recited in claim 5, wherein:
said α,β-ethylenically unsaturated monomer makes up 65 to 93% of a weight of said copolymer;
said α,β-ethylenically unsaturated carboxylic acid monomer makes up 7 to 20% of the weight of said copolymer; and
the amphiphilic monomer makes up 0.2 to 15% of the weight of said copolymer.

18. A copolymer as recited in claim 5, wherein the α,β-ethylenically unsaturated monomer is selected from the group consisting of alkyl acrylate, alkyl methacrylate, aromatic vinyl compound, heterocyclic vinyl compound, vinyl ester compound, halogenated vinyl compound, α-olefin compound, a monomer having a polar functional group, n-butyl acrylate and methyl methacrylate.

19. A copolymer as recited in claim 5, wherein the α,β-ethylenically unsaturated carboxylic acid monomer is a monobasic acid.

20. A copolymer as recited in claim 5, wherein the α,β-ethylenically unsaturated carboxylic acid monomer is a monobasic acid and a dibasic acid.

21. A protective coating composition comprising:
a copolymer comprising an α,β-ethylenically unsaturated monomer, an α,β-ethylenically unsaturated carboxylic acid monomer, and an amphiphilic monomer;
said copolymer is prepared as a coating for a surface; and
said coating has properties permitting easy and complete removal from said surface.

22. A protective coating composition comprising:
a copolymer comprising an α,β-ethylenically unsaturated monomer, an α,β-ethylenically unsaturated carboxylic acid monomer, and an amphiphilic monomer; and
said copolymer has an average molecular weight of 7000 to 25000.

23. A protective coating composition comprising:
a copolymer comprising an α,β-ethylenically unsaturated monomer, an α,β-ethylenically unsaturated carboxylic acid monomer and an amphiphilic monomer;
said α,β-ethylenically unsaturated monomer makes up 65 to 93% of a weight of said copolymer;
said α,β-ethylenically unsaturated carboxylic acid monomer makes up 7 to 20% of the weight of said copolymer; and
the amphiphilic monomer makes up 0.2 to 15% of the weight of said copolymer.

* * * * *